(12) United States Patent
Inoue

(10) Patent No.: US 12,418,847 B2
(45) Date of Patent: Sep. 16, 2025

(54) SERVER DEVICE, MONITORING METHOD, AND NON- TRANSITORY COMPUTER-READABLE MEDIUM

(71) Applicant: NEC Corporation, Tokyo (JP)

(72) Inventor: Takamichi Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 463 days.

(21) Appl. No.: 18/012,358

(22) PCT Filed: Jun. 30, 2021

(86) PCT No.: PCT/JP2021/024878
§ 371 (c)(1),
(2) Date: Dec. 22, 2022

(87) PCT Pub. No.: WO2022/004831
PCT Pub. Date: Jan. 6, 2022

(65) Prior Publication Data
US 2023/0254751 A1    Aug. 10, 2023

(30) Foreign Application Priority Data
Jul. 1, 2020  (JP) ................................ 2020-114079

(51) Int. Cl.
H04W 40/12    (2009.01)
(52) U.S. Cl.
CPC .................................. H04W 40/12 (2013.01)
(58) Field of Classification Search
None
See application file for complete search history.

(56) References Cited

U.S. PATENT DOCUMENTS

| | | | |
|---|---|---|---|
| 10,165,531 B1* | 12/2018 | Behera | H04W 56/001 |
| 10,271,250 B2* | 4/2019 | Sen | H04W 48/20 |
| 11,659,448 B2* | 5/2023 | Huang | H04W 24/02 370/328 |
| 2020/0336226 A1* | 10/2020 | Desai | H04W 64/003 |

FOREIGN PATENT DOCUMENTS

JP   2017-038332 A   2/2017

OTHER PUBLICATIONS

International Search Report for PCT Application No. PCT/JP2021/024878, mailed on Sep. 21, 2021.

\* cited by examiner

*Primary Examiner* — Brian S Roberts

(57) ABSTRACT

An object is to provide a server device capable of performing analysis on a terminal device applying redundancy to a communication path and simultaneously communicating with a plurality of access points. A server device (10) according to the present disclosure includes: a communication unit (11) receiving, from a sensor device that collects packets transferred between a wireless terminal and a first access point/a second access point, sensor information generated based on collected packets; a management unit (12) managing the first access point and the second access point in association with the wireless terminal when the wireless terminal communicates with the first access point and the second access point by applying redundancy to the communication path; and an analysis unit (13) generating information on a communication state of redundant communication paths by using sensor information regarding the first access point and the second access point.

9 Claims, 7 Drawing Sheets

SERVER DEVICE, MONITORING METHOD, AND NON-TRANSITORY COMPUTER-READABLE MEDIUM

This application is a National Stage Entry of PCT/JP2021/024878 filed on Jun. 30, 2021, which claims priority from Japanese Patent Application 2020-114079 filed on Jul. 1, 2020, the contents of all of which are incorporated herein by reference, in their entirety.

TECHNICAL FIELD

The present disclosure relates to a server device, a monitoring method, and a program.

BACKGROUND ART

In recent years, a cloud server maintains or improves quality of a wireless communication system by managing communication quality in the wireless communication system. The cloud server acquires information regarding the communication quality from a wireless communication terminal in the wireless communication system. Further, the cloud server causes the acquired information to be displayed on a display unit such as a display, whereby an administrator can easily recognize the communication quality of the wireless communication system.

Patent Literature 1 discloses that a capture device acquires and accumulates frames transmitted and received in wireless LAN communication between an access point and a terminal device for each of a plurality of predetermined measurement points. It is further disclosed that a measurement device analyzes characteristics of the wireless LAN communication, based on the frames accumulated in the capture device. Specifically, the measurement device calculates, for each terminal device, the number of data frames, an average bit rate, and the like at each measurement point. The terminal device performs wireless LAN communication with one access point, and switches the access point that performs wireless LAN communication depending on a radio wave condition or the like.

CITATION LIST

Patent Literature

[Patent Literature 1] Japanese Unexamined Patent Application Publication No. 2017-038332A

SUMMARY OF INVENTION

Technical Problem

The measurement device disclosed in Patent Literature 1 does not perform wireless LAN communication with a plurality of access points at the same time, but performs analysis of wireless LAN communication with respect to a terminal device that performs wireless LAN communication with one access point. In short, in the measurement device disclosed in Patent Literature 1, it is not assumed that analysis is performed on a terminal device that communicates with a plurality of access points by making a communication path redundant. Therefore, the measurement device disclosed in Patent Literature 1 has a problem that, when a terminal device having redundant communication paths is mixed in a wireless system, it is not possible to indicate an analysis result in consideration of the redundancy of communication paths.

An object of the present disclosure is to provide a server device, a monitoring method, and a program that are capable of performing analysis on a terminal device that simultaneously communicates with a plurality of access points by applying redundancy to a communication path.

Solution to Problem

A server device according to a first aspect of the present disclosure includes: a communication unit configured to receive sensor information from a sensor device that collects packets transferred between a wireless terminal and a first access point and between the wireless terminal and a second access point, the sensor information being generated based on the collected packets; a management unit configured to manage the first access point and the second access point in association with the wireless terminal when the wireless terminal performs communication with the first access point and the second access point by applying redundancy to a communication path; and an analysis unit configured to generate information regarding a communication state of redundant communication paths, by using the sensor information regarding the first access point and the second access point.

A monitoring method according to a second aspect of the present disclosure includes: receiving sensor information from a sensor device that collects packets transferred between a wireless terminal and a first access point and between the wireless terminal and a second access point, the sensor information being generated based on the collected packets; managing the first access point and the second access point in association with the wireless terminal when the wireless terminal performs communication with the first access point and the second access point by applying redundancy to a communication path; and generating information regarding a communication state of redundant communication paths, by using the sensor information regarding the first access point and the second access point.

A program according to a third aspect of the present disclosure causes a computer to execute: receiving sensor information from a sensor device that collects packets transferred between a wireless terminal and a first access point and between the wireless terminal and a second access point, the sensor information being generated based on the collected packets; managing the first access point and the second access point in association with the wireless terminal when the wireless terminal performs communication with the first access point and the second access point by applying redundancy to a communication path; and generating information regarding a communication state of redundant communication paths, by using the sensor information regarding the first access point and the second access point.

Advantageous Effects of Invention

According to the present disclosure, it is possible to provide a server device, a monitoring method, and a program that are capable of performing analysis on a terminal device that applies redundancy to a communication path and simultaneously communicates with a plurality of access points.

EXAMPLE EMBODIMENT

First Example Embodiment

Figure 1:
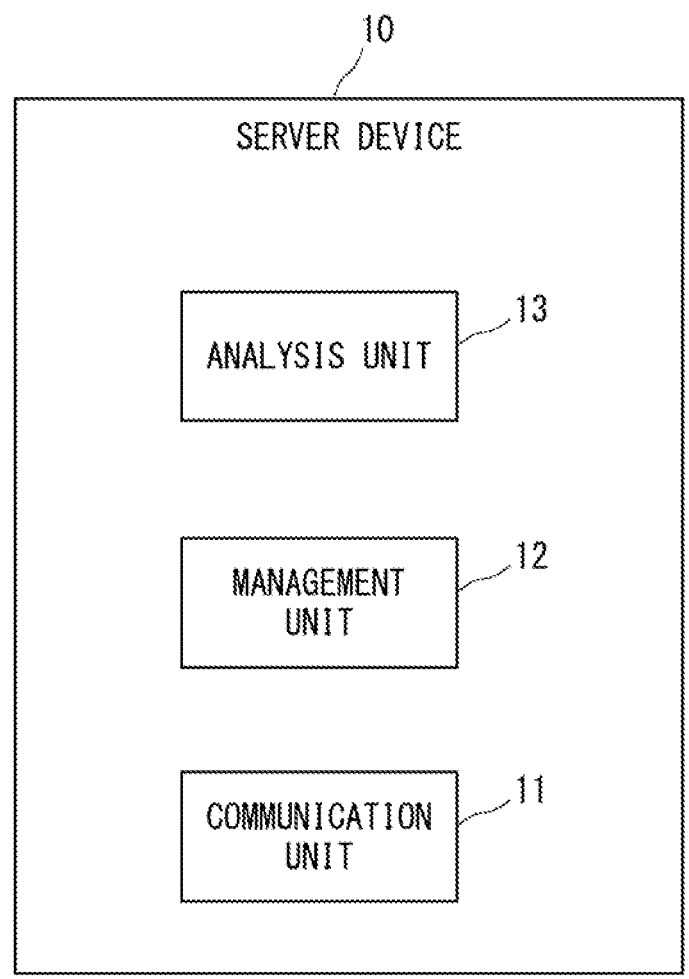
FIG. 1 is a configuration diagram of a server device according to a first example embodiment.

Hereinafter, example embodiments of the present disclosure will be explained with reference to the drawings. A configuration example of a server device 10 according to a first example embodiment will be explained by using FIG. 1. The server device 10 may be a computer device that operates in such a manner that a processor executes a program stored in a memory.

The server device 10 includes a communication unit 11, a management unit 12, and an analysis unit 13. The communication unit 11, the management unit 12, and the analysis unit 13 may be software or modules that execute processing when a processor executes a program stored in a memory. Alternatively, the communication unit 11, the management unit 12, and the analysis unit 13 may be hardware such as a circuit or a chip.

The communication unit 11 receives sensor information from a sensor device. The sensor device collects packets transferred between the wireless terminal and a first access point and between the wireless terminal and a second access point. Further, the sensor device generates sensor information, based on the collected packets.

For example, the wireless terminal performs wireless Local Area Network (LAN) communication with the first access point and the second access point. The wireless terminal may be referred to as a slave unit in the wireless LAN communication, and the first access point and the second access point may be referred to as master units in the wireless LAN communication.

The packet may be referred to as a frame, data, or the like. The packet may be user data such as image data or moving image data, or may be control data. The user data may be referred to as a data frame, for example, and the control data may be referred to as a management frame or a control frame.

Collecting packets by the sensor device may be rephrased as capturing packets by the sensor device.

The sensor information may be, for example, Received Signal Strength Indicator (RSSI), a band occupancy rate, the number of packets transmitted by the access point in a predetermined period, and the number of packets transmitted by the wireless terminal in a predetermined period. Alternatively, the sensor information may be a throughput, a retransmission rate, or the like in communication between the wireless terminal and the access point.

The management unit 12 manages the first access point and the second access point in association with the wireless terminal when the wireless terminal performs communication with the first access point and the second access point by applying redundancy to a communication path. The wireless terminal may apply redundancy to the communication path in such a manner that the wireless terminal has two wireless modules and performs data communication simultaneously with the first access point and the second access point. Alternatively, the wireless terminal may apply redundancy to a communication path in such a manner that the wireless terminal has two wireless modules and by switching the two wireless modules, data communication with the first access point and the second access point is performed. In these cases, for example, the wireless terminal communicates with the first access point by using one wireless module and with the second access point by using another wireless module.

The management unit 12 manages the first access point and the second access point in association with the wireless terminal as an access point in which the wireless terminal performs communication by applying redundancy to a communication path. The management unit 12 may update information of access points to be managed in association with the wireless terminal when the access point through which the wireless terminal performs communication by applying redundancy to a communication path is changed. For example, the management unit 12 may manage the first access point and the second access point in association with the wireless terminal by using a database. When the wireless terminal performs communication with the first access point and a third access point, the third access point is managed in association with the wireless terminal and the first access point, instead of the second access point.

The analysis unit 13 generates information regarding a communication state of the redundant communication path by using the sensor information regarding the first access point and the second access point. The information regarding the communication state may be information indicating the communication quality, or may be information indicating whether or not communication via the communication path is possible.

As explained above, when the wireless terminal performs communication with the first access point and the second access point by applying redundancy to the communication path, the server device 10 manages the first access point and the second access point in association with the wireless terminal. Accordingly, the server device 10 can manage the information regarding the communication 30 state of the wireless terminal as analysis information regarding the redundant wireless terminal.

Second Example Embodiment

Next, a configuration example of a visualization system according to a second example embodiment will be explained by using FIG. 2. The visualization system is a system in which a cloud server 700 monitors wireless LAN terminals 300 to 302 by using information acquired from wireless sensors 100 to 102.

Figure 2:
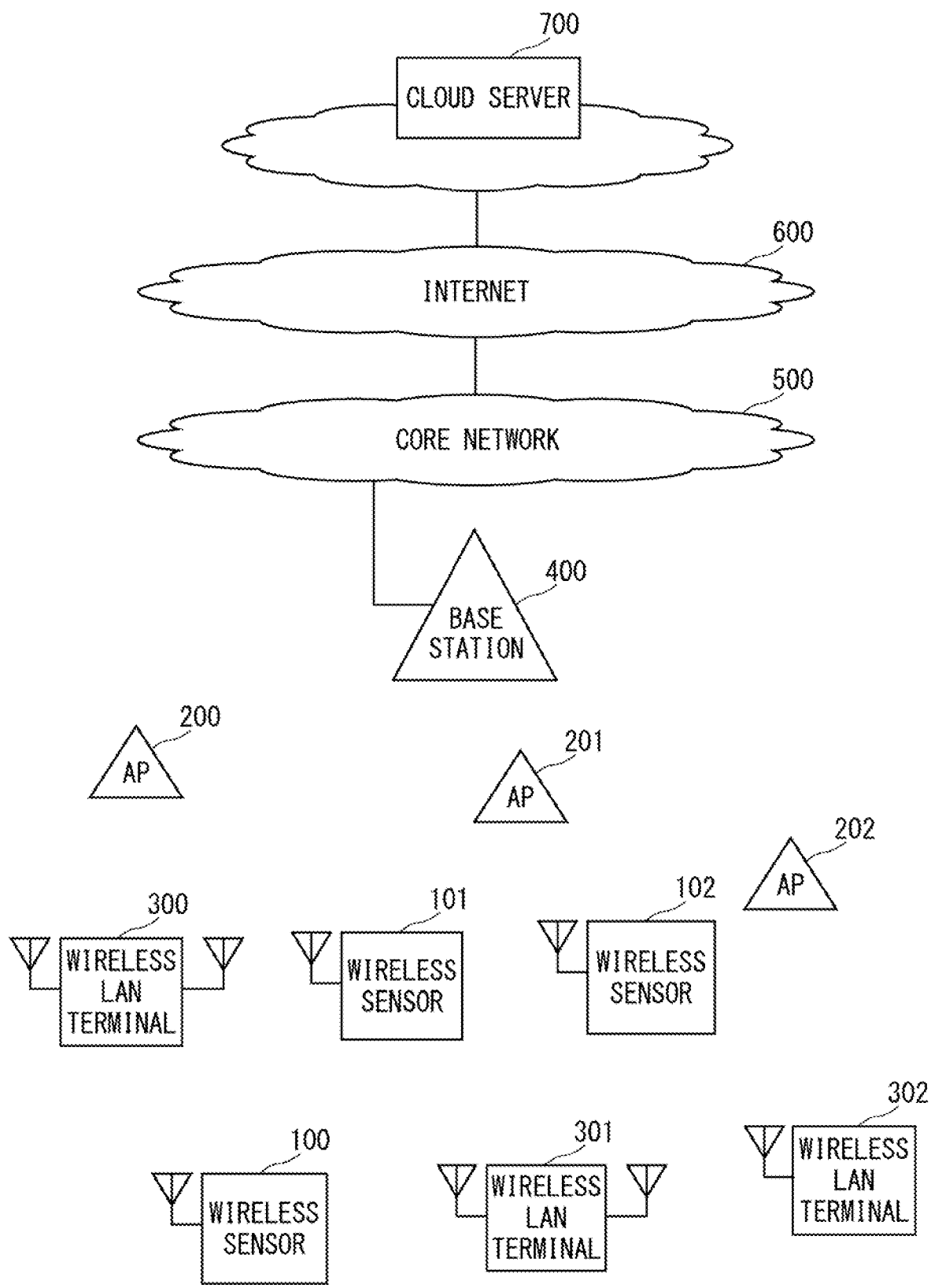
FIG. 2 is a configuration diagram of a visualization system according to a second example embodiment.

The visualization system of FIG. 2 includes a base station 400, a core network 500, the Internet 600, and the cloud server 700. Further, the visualization system of FIG. 2 includes wireless sensors 100 to 102, APs 200 to 202, and wireless LAN terminals 300 to 302. The wireless sensors 100 to 102 are equivalent to the sensor device. The cloud server 700 is equivalent to the server device 10.

The base station 400 and the core network 500 are equivalent to a mobile network to be provided by a communication carrier.

The wireless LAN terminals 300 to 302 are connected to any one of the APs 200 to 202, which is a master unit, as slave units in wireless LAN communication, and perform wireless LAN communication. Further, it is illustrated that the wireless LAN terminal 300 and the wireless LAN terminal 301 have two wireless modules, and the wireless LAN terminal 302 has one wireless module. The wireless LAN terminal 301 and the wireless LAN terminal 302 have two wireless modules, and therefore, wireless LAN communication can be performed simultaneously with different APs. The wireless module may include, for example, an antenna, a modulator that modulates data, and a demodulator that demodulates data.

The wireless sensors 100 to 102 capture packets transmitted and received between the wireless LAN terminals 300 to 302 and the APs 200 to 202.

The wireless sensors 100 to 102 perform bidirectional communication with the cloud server 700 via the base station 400, the core network 500, and the Internet 600. The base station 400 may support, for example, Long Term Evolution (LTE), 5G, or local 5G as a radio communication standard. The base station 400 performs data communication by setting an LTE line, a 5G line, or a local 5G line to the wireless sensors 100 to 102 or the wireless terminal. Further, the wireless sensors 100 to 102 may perform communication with the Internet 600 via a wired line or Ethernet (registered trademark). Further, the cloud server 700 may be arranged in an intranet constructed in a specific company or the like.

Figure 3:
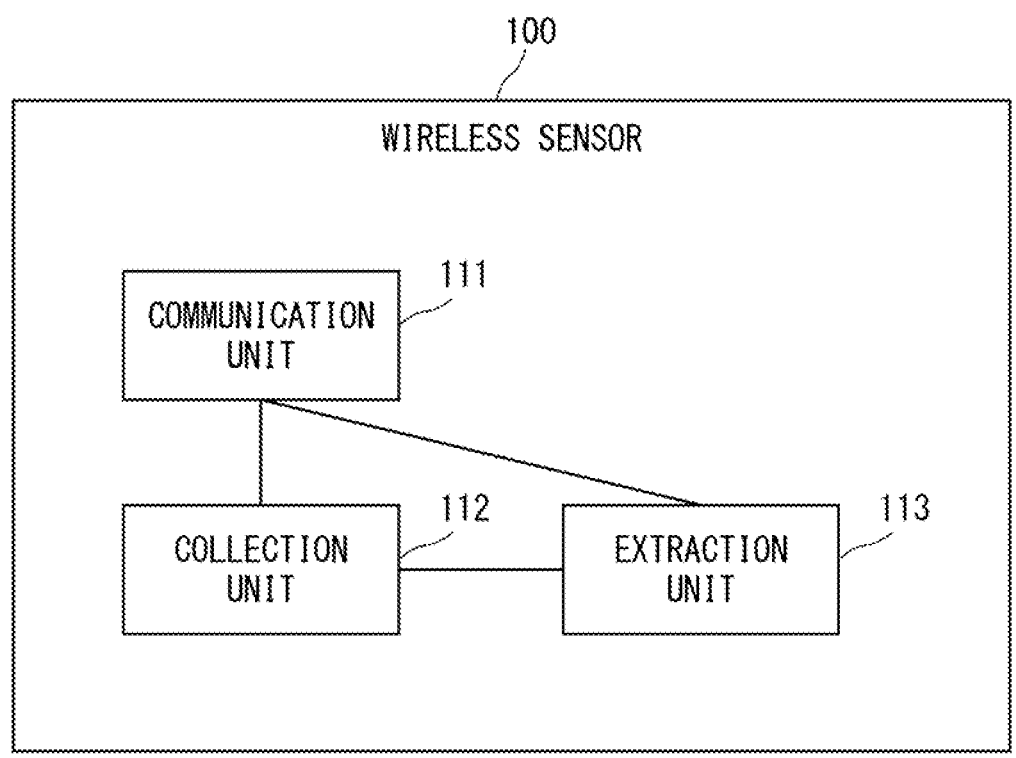
FIG. 3 is a configuration diagram of a wireless sensor according to the second example embodiment.

Next, a configuration example of a wireless sensor 100 according to the second example embodiment will be explained by using FIG. 3. Further, since the wireless sensor 101 and the wireless sensor 102 have the same configuration as the wireless sensor 100, detailed explanation thereof will be omitted.

The wireless sensor 100 includes a communication unit 111, a collection unit 112, and an extraction unit 113. The communication unit 111, the collection unit 112, and the extraction unit 113 may be software or modules that execute processing when a processor executes a program stored in a memory. Alternatively, the communication unit 111, the collection unit 112, and the extraction unit 113 may be hardware such as a circuit or a chip.

The communication unit 111 performs communication with the base station 400. The communication unit 111 performs communication with the base station 400 by using, for example, a wireless communication standard defined by 3GPP. Specifically, the communication unit 111 may perform communication with the base station 400 by using LTE. The communication unit 111 may be constituted of an antenna, a modulator, and a demodulator complying with a frequency of wireless communication with the base station 400.

The communication unit 111 acquires a packet collection condition and extraction condition from the cloud server 700 via the base station 400, the core network 500, and the Internet 600. The packet collection condition may be referred to as the packet capture condition. The communication unit 111 outputs the collection condition to the collection unit 112, and outputs the extraction condition to the extraction unit 113. The communication unit 111 may periodically receive the collection condition and the extraction condition from the cloud server 700, or may irregularly receive a collection condition and an extraction condition that have been changed. The collection condition and the extraction condition are set or generated in the cloud server 700.

The collection unit 112 captures packets being transmitted and received between the wireless LAN terminals 300 to 302 and the APs 200 to 202 according to the collection conditions. The collection condition includes a frequency channel. The collection unit 112 captures a packet being transferred via the frequency channel included in the collection condition. In addition to the frequency channel, the collection condition may include a frequency band, a collection time, a collection period, the number of bytes, and the like.

The collection unit 112 may include an antenna, a modulator, and a demodulator complying with a frequency of wireless LAN communication with at least one of the APs 200 to 202.

When two frequency channels are set as the collection condition, the collection unit 112 may capture packets of different frequency channels at the same time by using two antennas, modulators, and demodulators. Alternatively, when two frequency channels are set as the collection condition, the collection unit 112 may switch the frequency channels and capture packets of different frequency channels at predetermined time intervals by using one antenna, modulator, and demodulator.

The extraction unit 113 extracts a packet from among the packets captured by the collection unit 112 according to the extraction condition. Extracting a packet may be rephrased as selecting a packet. For example, the extraction condition may be a destination Basic Service Set Identifier (BSSID) or a source BSSID of the packet. The BSSID may be set with, for example, Media Access Control (MAC) addresses of APs. The extraction condition may be a destination IP address or a source IP address of the packet. The extraction condition may be a destination MAC address or a source MAC address of the packet. In short, the extraction unit 113 may extract a specific wireless LAN terminal, for example, a packet transmitted from the wireless LAN terminal 300, from among the captured packets. Alternatively, the extraction unit 113 may extract all the packets transmitted to the AP 200. The extraction unit 113 may designate addresses of a plurality of wireless LAN terminals as the extraction condition. In addition, an IP address or a MAC address related to a packet to be captured may be designated as the extraction condition, and an IP address or a MAC address related to a packet not to be captured may be designated, as the extraction condition.

The extraction unit 113 generates sensor information to be observed or measured from the extracted packet. A classification or a type and the like of the generated sensor information may be designated in the extraction condition. For example, the extraction unit 113 may generate address information indicating a source address or a destination address set in a header of the extracted packet. Alternatively, the extraction unit 113 may generate RSSI data observed from the extracted packet. The RSSI is not an RSSI related to a packet received by the wireless LAN terminal or the AP, but is an RSSI observed from a packet received or captured by the wireless sensor 100.

Furthermore, the extraction unit 113 may generate throughput data and transmission rate data of the packets to be transmitted by the wireless LAN terminals 300 to 302, by using the number of packets and a data length of the packets transmitted from the wireless LAN terminals 300 to 302 within a predetermined period. Furthermore, the extraction unit 113 may identify whether or not the packet is a retransmission packet by analyzing a header portion of the packet, and generate data indicating the number of retransmission packets. Further, the extraction unit 113 may generate data related to a band occupancy rate of the wireless LAN terminal 300 by using the maximum line speed between the AP and the wireless LAN terminal and the throughput data of the wireless LAN terminal 300. Furthermore, the extraction unit 113 may generate data related to a retransmission rate of a packet by using the total number of received packets and the number of retransmission packets. The retransmission rate of the packet may be generated for each wireless LAN terminal or may be generated as data related to all wireless LAN terminals.

The communication unit 111 transmits information such as RSSI generated by the extraction unit 113 as sensor information to the cloud server 700 via the base station 400, the core network 500, and the Internet 600.

Figure 4:
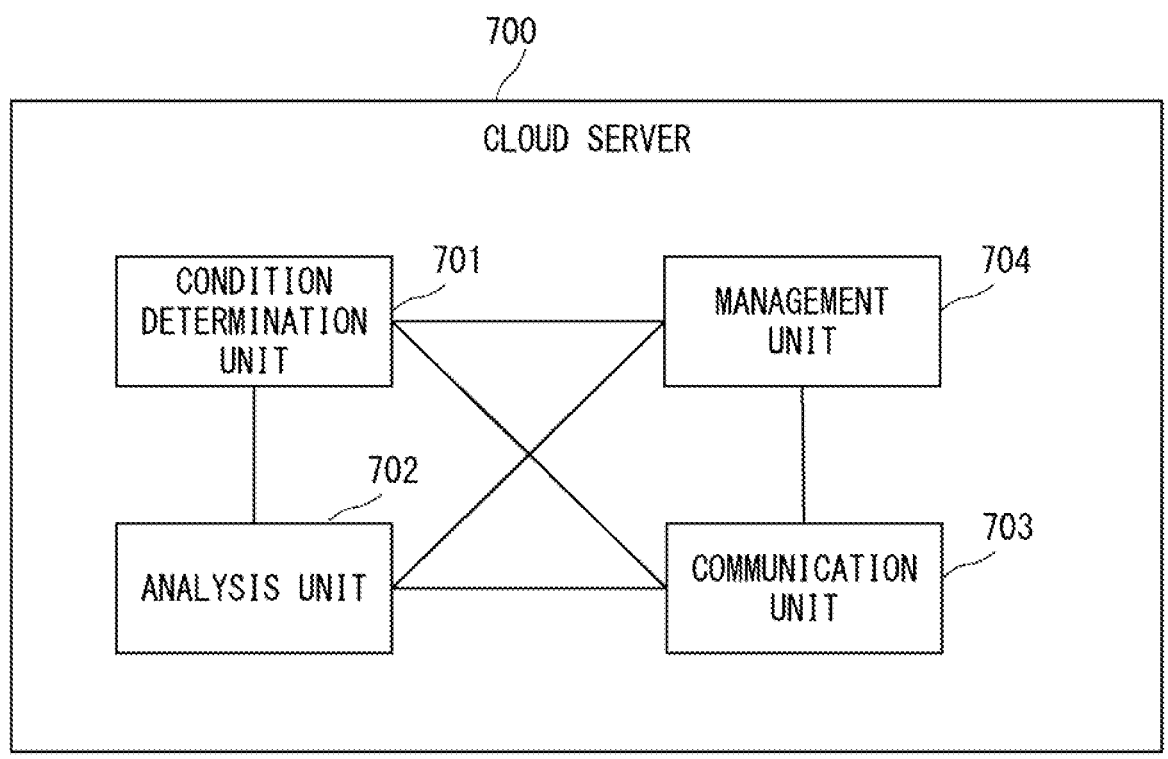
FIG. 4 is a configuration diagram of a cloud server according to the second example embodiment.

Next, a configuration example of the cloud server 700 will be described by using FIG. 4. The cloud server 700 may be a computer device that operates when a processor executes a program stored in a memory. Further, the cloud server 700 may have a built-in memory for storing a database, or may be connected to a database server device via a network, a cable, or the like. The cloud server 700 saves data received from the wireless sensors 100 to 102 in a database.

The cloud server 700 includes a condition determination unit 701, an analysis unit 702, a communication unit 703, and a management unit 704. The condition determination unit 701, the analysis unit 702, the communication unit 703, and the management unit 704 may be software or modules that execute processing when a processor executes a program stored in a memory. Alternatively, the condition determination unit 701, the analysis unit 702, the communication unit 703, and the management unit 704 may be hardware such as a circuit or a chip.

The analysis unit 702 is equivalent to the analysis unit 13 of the server device 10. The management unit 704 is equivalent to the management unit 12 of the server device 10. The communication unit 703 is equivalent to the communication unit 11 of the server device 10. Hereinafter, functions or operations of the cloud server 700 which are different from those of the server device 10 will be mainly explained, and detailed explanations of the same functions or operations as those of the server device 10 will be omitted.

The condition determination unit 701 displays information regarding the setting of the collection condition and the extraction condition on a display or the like that is used integrally with the cloud server 700. An administrator of the cloud server 700 may confirm the information displayed on the display and input the collection condition and the extraction condition. For example, parameter information and the like that can be selected as the collection condition and the extraction condition may be displayed on the display.

The condition determination unit 701 outputs the collection condition and the extraction condition determined according to the input information to the management unit 704. The condition determination unit 701 may save the collection condition and the extraction condition in the management unit 704 via the communication unit 703. The communication unit 703 transmits the collection condition and the extraction condition being output from the condition determination unit 701 to at least one of the wireless sensors 100 to 102 via the Internet 600, the core network 500, and the base station 400. The condition determination unit 701 may determine a different collection condition or extraction condition for each wireless sensor.

When the collection condition or the extraction condition is changed, the condition determination unit 701 may transmit a change notification indicating that the collection condition or the extraction condition is changed to each wireless sensor. In this case, the wireless sensor that has received the change notification accesses the cloud server 700 and acquires a collection condition or extraction condition after change. Alternatively, the condition determination unit 701 may transmit the changed information to the wireless sensor without transmitting the change notification. Alternatively, the condition determination unit 701 may periodically transmit the collection condition or the extraction condition to each of the wireless sensors. For example, the condition determination unit 701 transmits the collection condition and the extraction condition to the wireless sensor via the communication unit 703. Further, the condition determination unit 701 outputs the collection condition or extraction condition after change to the management unit 704 via the communication unit 703. The management unit 704 stores the collection condition or extraction condition after change, which has been received.

The communication unit 703 receives sensor information from the wireless sensors 100 to 102. The communication unit 703 saves the received sensor information in the management unit 704. The analysis unit 702 processes the data saved in the management unit 704 into display data and displays the data on a display or the like.

When the wireless LAN terminal applies redundancy to the communication path and performs communication with a plurality of Aps, the management unit 704 manages the wireless LAN terminal and the AP of the connection destination in association with each other. For example, the wireless LAN terminal 300 can perform communication with the AP 200 and the AP 201 by using two wireless modules. The wireless LAN terminal 300 may perform communication with the AP 200 and the AP 201 at the same time by using two wireless modules, or may perform communication with the AP 200 and the AP 201 by switching the wireless modules to be used. A state in which the wireless LAN terminal 300 can perform communication with the AP may be rephrased as a state in which the wireless LAN terminal 300 is connected to the AP.

For example, the administrator or the like of the cloud server 700 groups the BSSID indicating the AP 200 and the BSSID indicating the AP 201, which are communication destinations of the wireless LAN terminal 300, and the wireless LAN terminal 300, and inputs a name, ID, or the like for discriminating the group. The BSSID is information for discriminating respective wireless LAN communication areas formed by the AP 200 and the AP 201. The respective MAC addresses of the AP 200 and the AP 201 may be set in the BSSID.

When the AP 200 and the AP 201 that are communication destinations of the wireless LAN terminal 300 are predetermined, the administrator or the like of the cloud server 700 may input the AP 200 and the AP 201 as APs to be grouped with the wireless LAN terminal 300. Alternatively, the administrator or the like of the cloud server 700 may identify that the APs to which the wireless LAN terminal 300 is connected are the AP 200 and the AP 201 by checking the sensor information saved in the management unit 704. In this case, the administrator or the like of the cloud server 700 may input the identified AP 200 and AP 201 as APs to be grouped with the wireless LAN terminal 300. Alternatively, the management unit 704 may autonomously identify the APs to which the wireless LAN terminal 300 is connected, based on the saved or managed sensor information.

The analysis unit 702 generates quality information indicating the grouped wireless LAN terminals 300 from the sensor information managed by the management unit 704 and received from the wireless sensors 100 to 102. The quality information may be, for example, a RSSI related to the wireless LAN terminal 300, a band occupancy rate, the number of packets transmitted by the wireless LAN terminal 300, or the number of packets received by the wireless LAN terminal 300. Alternatively, the quality information may be a throughput, a retransmission rate, or the like in communication between the wireless LAN terminal 300 and the AP 200 and between the wireless LAN terminal 300 and the AP 201. Alternatively, the quality information may be Modulation Coding Scheme (MCS) related to the wireless LAN terminal 300.

Figure 5:
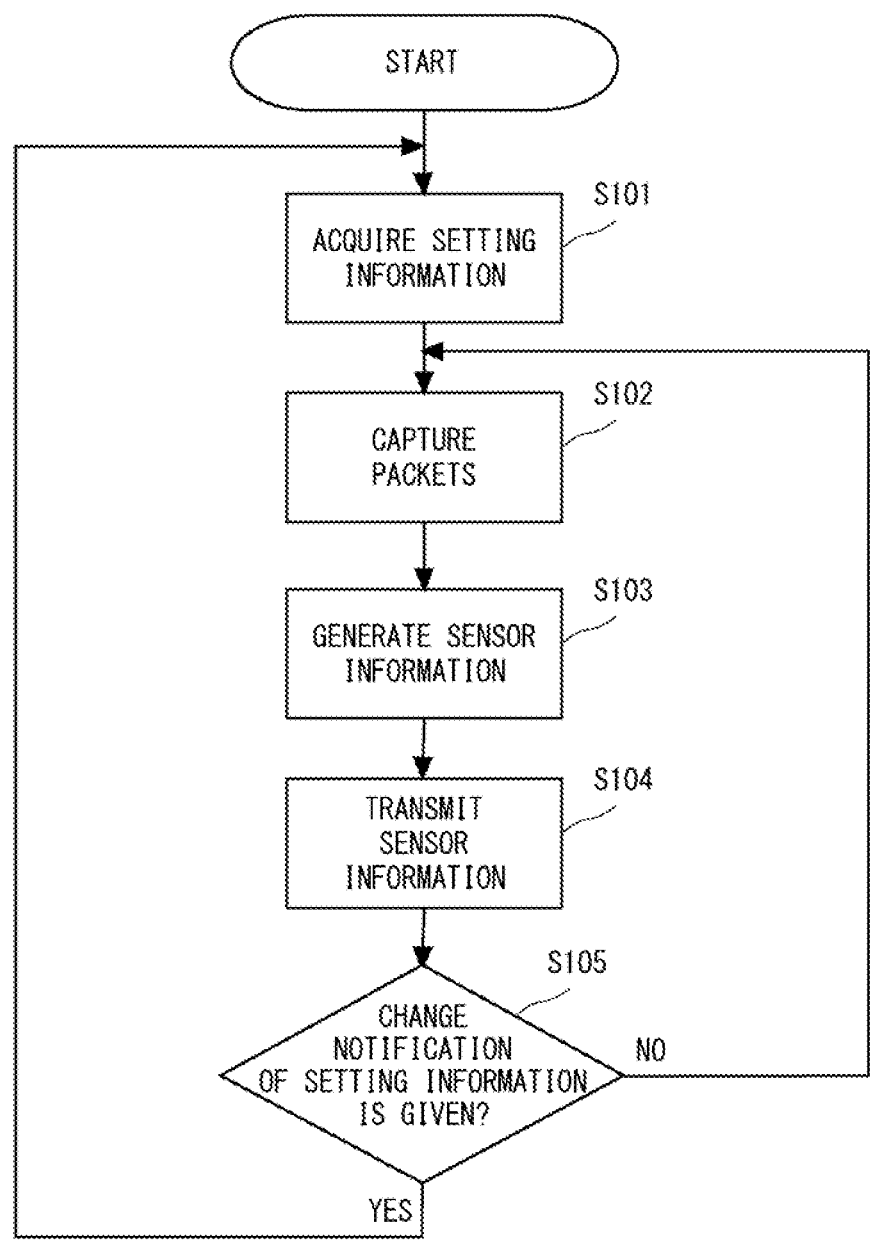
FIG. 5 is a diagram illustrating a flow of transmission processing of sensor information in the wireless sensor according to the second example embodiment.

Next, a flow of processing of transmitting sensor information in the wireless sensor 100 according to the second example embodiment will be explained by using FIG. 5. First, the communication unit 111 receives setting information from the cloud server 700 (S101). The setting information includes at least one of a collection condition and an extraction condition. For example, the communication unit 111 may receive a newly set collection condition and extraction condition, or may receive a changed collection condition or extraction condition.

Next, the collection unit 112 captures a packet according to the collection condition (S102). For example, the collection unit 112 captures a packet transferred via a frequency channel included in the collection condition. Next, the extraction unit 113 generates sensor information observed from the extracted packet according to the extraction condition (S103). For example, the extraction unit 113 generates RSSI data as sensor information.

Next, the communication unit 111 transmits the sensor information generated by the extraction unit 113 to the cloud server 700 (S104).

Next, the communication unit 111 determines whether or not a change notification of the setting information has been received from the cloud server 700 (S105). When the communication unit 111 receives the change notification of the setting information, the processing of step S101 and subsequent steps are repeated. When the communication unit 111 has not received the change notification of the setting information, the processing of step S102 and subsequent steps are repeated.

Figure 6:
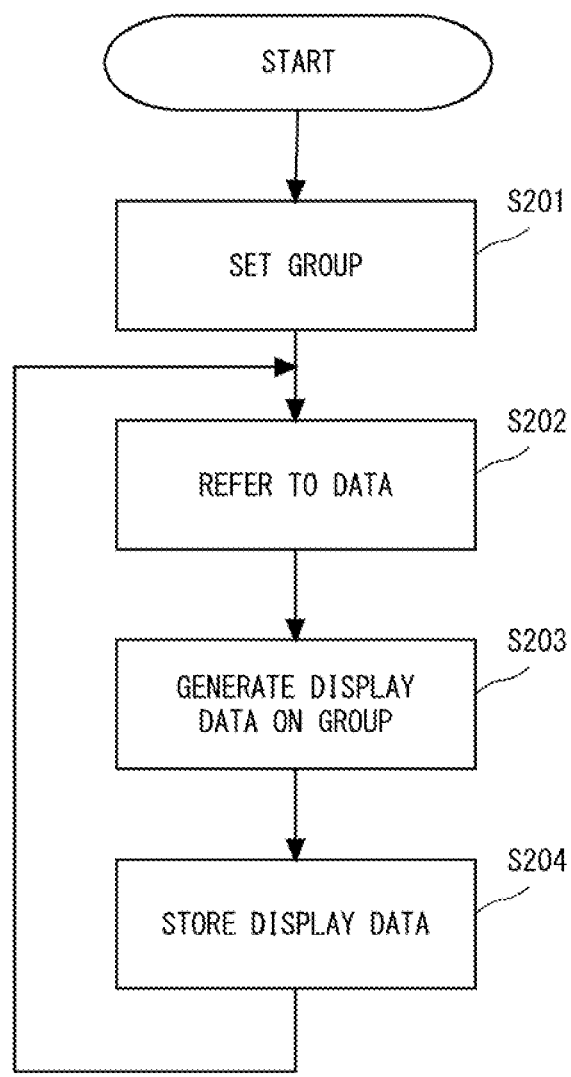
FIG. 6 is a diagram illustrating a flow of monitoring processing of a wireless LAN terminal in a cloud server 700 according to the second example embodiment.

Next, a flow of monitoring processing of the wireless LAN terminal in the cloud server 700 according to the second example embodiment will be explained by using FIG. 6. First, the management unit 704 performs group settings related to the wireless LAN terminal 300 and the like (S201). For example, when there are two BSSID that are communication destinations or connection destinations of the wireless LAN terminal 300, the management unit 704 manages the two BSSIDs and the wireless LAN terminal 300 as one group. For example, the management unit 704 manages a group by using a name, an ID, or the like that discriminates the group. An administrator or the like of the cloud server 700 may input the name, ID, or the like of the group via an input device of the cloud server 700. In addition, the management unit 704 may add a BSSID, a frequency channel to be a new monitoring target, or the like to a group that has already been set.

Next, the analysis unit 702 refers to the sensor information saved in the management unit 704, and extracts the sensor information regarding the wireless LAN terminal that performs communication with a plurality of access points by applying redundancy to the communication path (S202). For example, the analysis unit 702 extracts sensor information regarding the wireless LAN terminal 300. The analysis unit 702 may extract sensor information regarding the wireless LAN terminal designated by the administrator of the cloud server 700 or the like. Alternatively, the analysis unit 702 may identify a wireless LAN terminal that performs communication with a plurality of access points by applying redundancy to the communication path, and extract sensor information regarding the identified wireless LAN terminal. For example, the analysis unit 702 may identify, from the sensor information, a wireless LAN terminal that performs communication with a plurality of access points in a predetermined period as a wireless LAN terminal that performs communication with a plurality of access points by applying redundancy to the communication path.

Next, the analysis unit 702 generates display data related to the group (S203). The display data are data displayed on a display or the like that is used integrally with the cloud server 700. For example, the analysis unit 702 generates quality information regarding the wireless LAN terminal 300 as display data. The quality information may be, for example, a RSSI related to the wireless LAN terminal 300, a band occupancy rate, the number of packets transmitted by the wireless LAN terminal 300, or the number of packets received by the wireless LAN terminal 300. Alternatively, the quality information may be a throughput, a retransmission rate, or the like in communication between the wireless LAN terminal 300 and the AP 200 and between the wireless LAN terminal 300 and the AP 201. Alternatively, the quality information may be an MCS related to the wireless LAN terminal 300.

In addition, when the wireless LAN terminal 300 simultaneously performs data communication by using a redundant communication path, the analysis unit 702 may generate a combined value, an average value, a maximum value, a minimum value, and the like of the quality information as display data. The simultaneous data communication is to perform data communication with the AP 200 and the AP 201 at substantially the same timing by using two wireless modules included in the wireless LAN terminal 300. Substantially the same timing does not only include exactly the same timing, but also includes a case where the wireless LAN terminal 300 performs data communication by using two wireless modules within a predetermined period.

The analysis unit 702 may generate, as display data, a combined value, an average value, a maximum value, a minimum value, and the like of a throughput of data communication between the wireless LAN terminal 300 and the AP 200 and a throughput of data communication between the wireless LAN terminal 300 and the AP 201.

Alternatively, in a case where the communication path to be used for data communication is switched among the redundant communication paths and used, the analysis unit 702 may generate, in addition to the quality information, the number of times of switching the communication path, a switching timing, an establishment status of a communication path for which data communication is not performed, and the like. The establishment status of the communication path for which data communication is not performed may be, for example, information indicating whether or not data communication is performed in the communication path for which data communication is not performed. Specifically, it may be information regarding whether or not a wireless link is established between the wireless LAN terminal 300 and an AP on the communication path for which data communication is not performed.

Next, the analysis unit 702 displays the display data on a display that is used integrally with the cloud server 700, and saves the display data in the management unit 704 (S204).

Thereafter, the analysis unit 702 may repeat the processing in step S202 and subsequent steps, and display the quality information regarding the wireless LAN terminal 300 on the display as time-series data.

Further, the analysis unit 702 displays the display data saved in the management unit 704 on the display in accordance with an operation of a page displayed on the display, which is performed by the administrator of the cloud server 700 or the like. For example, when the administrator or the like inputs information indicating that the wireless LAN terminal 300 is to be displayed, the analysis unit 702 may simultaneously display quality information regarding data communication between the wireless LAN terminal 300 and the AP 200 and between the wireless LAN terminal 300 and the AP 201. Alternatively, the analysis unit 702 may display a combined value or the like of quality information regarding data communication between the wireless LAN terminal 300 and the AP 200 and between the wireless LAN terminal 300 and the AP 201. Alternatively, the analysis unit 702 may display only the quality information regarding one of the APs in which the wireless LAN terminal 300 performs data communication, and may display the quality information regarding another AP in such a way that the quality information regarding the another AP can be selected.

As described above, the cloud server 700 according to the second example embodiment can manage a wireless LAN terminal having a redundant communication path and a plurality of APs that are communication destinations of the wireless LAN terminal in association with each other. Further, the cloud server 700 can calculate a combined value, an average value, and the like of the quality information regarding the wireless LAN terminal having a redundant communication path. Thus, the cloud server 700 can analyze the quality information of the wireless LAN terminal in consideration of the redundancy of the communication path.

Figure 7:
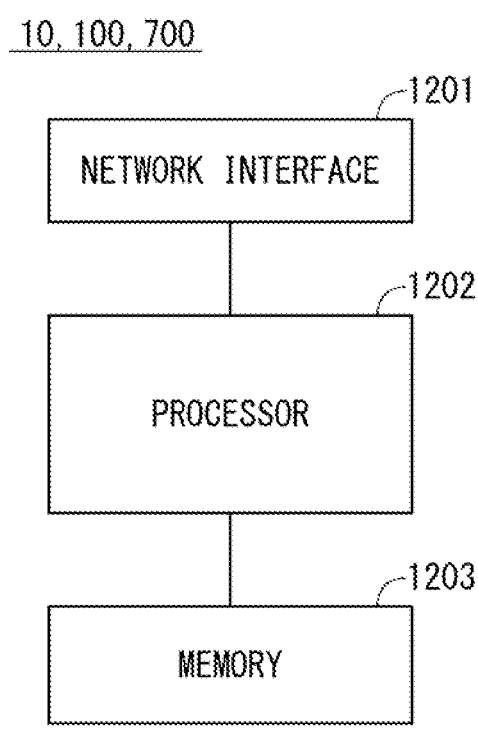
FIG. 7 is a configuration diagram of a sensor device, a wireless sensor, and a cloud server according to each example embodiment.

FIG. 7 is a block diagram illustrating a configuration example of the server device 10, the wireless sensor 100, and the cloud server 700 (hereinafter, referred to as the server device 10 and the like). Referring to FIG. 7, the server device 10 and the like include a network interface 1201, a processor 1202, and a memory 1203. The network interface 1201 is used for communicating with a network node (e.g., eNB, MME, P-GW). The network interface 1201 may include, for example, a network interface card (NIC) compliant with IEEE 802.3 series. Herein, eNB represents evolved Node B, MME represents Mobility Management Entity, and P-GW represents Packet Data Network Gateway. IEEE represents Institute of Electrical and Electronics Engineers.

The processor 1202 reads and executes software (a computer program) from the memory 1203 and performs the processing of the server device 10 and the like that is explained by using the flowchart in the above-described example embodiment. The processor 1202 may be, for example, a microprocessor, an MPU, or a CPU. The processor 1202 may include a plurality of processors.

The memory 1203 is constituted of a combination of a volatile memory and a non-volatile memory. The memory 1203 may include a storage located remotely from the processor 1202. In this case, the processor 1202 may access the memory 1203 via Input/Output (I/O) interfaces that are not illustrated.

In the example of FIG. 7, the memory 1203 is used for storing a group of software modules. The processor 1202 reads a group of these software modules from the memory 1203 and execute the software modules, thereby enabling to perform the processing of the server device 10 and the like explained in the above-described example embodiment.

As explained by using FIG. 7, each of the processors included in the server device 10 and the like in the above-described example embodiment executes one program or a plurality of programs including a group of instructions for causing a computer to execute the algorithm explained by using the drawings.

In the examples described above, the program may be stored and provided to the computer by using various types of non-transitory computer-readable media. Non-transitory computer-readable media include various types of tangible storage media. Examples of the non-transitory computer-readable media include magnetic recording media (e.g., flexible disks, magnetic tapes, hard disk drives), magneto-optical recording media (e.g., magneto-optical disks), Read Only Memory (CD-ROM), CD-R, CD-R/W, and semiconductor memory (e.g., mask ROM, Programmable ROM (PROM), Erasable PROM (EPROM), flash ROM, Random Access Memory (RAM)). The program may also be provided to the computer by various types of transitory computer readable media. Examples of the transitory computer readable media include electrical signals, optical signals, and electromagnetic waves. The transitory computer readable medium can provide the program to the computer via a wired communication path such as an electric wire and an optical fiber, or a wireless communication path.

The present disclosure is not limited to the above-described example embodiments, and can be appropriately modified without departing from the spirit of the present disclosure.

Although the present invention has been explained with reference to the example embodiments, the present invention is not limited to the above. Various modifications that can be understood by a person skilled in the art within the scope of the invention can be made to the configuration and details of the present invention.

This application is based upon and claims the benefit of priority from Japanese patent application No. 2020-114079, filed on Jul. 1, 2020, the disclosure of which is incorporated herein in its entirety.

REFERENCE SIGNS LIST

10 SERVER DEVICE
11 COMMUNICATION UNIT
12 MANAGEMENT UNIT
13 ANALYSIS UNIT
100 WIRELESS SENSOR
101 WIRELESS SENSOR
102 WIRELESS SENSOR
111 COMMUNICATION UNIT
112 COLLECTION UNIT
113 EXTRACTION UNIT
200 AP
201 AP
202 AP
300 WIRELESS LAN TERMINAL
301 WIRELESS LAN TERMINAL
302 WIRELESS LAN TERMINAL
400 BASE STATION
500 CORE NETWORK
600 INTERNET
700 CLOUD SERVER
701 CONDITION DETERMINATION UNIT
702 ANALYSIS UNIT
703 COMMUNICATION UNIT
704 MANAGEMENT UNIT

What is claimed is:

1. A server device comprising:
at least one memory storing instructions, and
at least one processor configured to execute the instructions to;
receive sensor information from a sensor device that collects packets transferred between a wireless terminal and a first access point and between the wireless terminal and a second access point, the sensor information being generated based on the collected packets;
manage the first access point and the second access point in association with the wireless terminal when the wireless terminal performs communication with the first access point and the second access point by applying redundancy to a communication path; and
generate information regarding a communication state of redundant communication paths by using the sensor information regarding the first access point and the second access point.

2. The server device according to claim 1, wherein the at least one processor is further configured to execute the instructions to manage a first BSSID used by the wireless terminal for communication with a first access point and a second BSSID used by the wireless terminal for communication with a second access point in association with each other.

3. The server device according to claim 1, wherein the at least one processor is further configured to execute the instructions to combine first sensor information regarding a first communication path with the first access point and second sensor information regarding a second communication path with the second access point, average the first sensor information and the second sensor information, or select a maximum value or a minimum value of the first sensor information and the second sensor information, and generate information regarding the communication state.

4. The server device according to claim 3, wherein, when the wireless terminal performs communication by switching between the first communication path and the second communication path, the at least one processor is further configured to execute the instructions to generate information indicating the number of times of switching in a predetermined period as information regarding the communication state.

5. The server device according to claim 3, wherein, when the wireless terminal performs communication by switching between the first communication path and the second communication path, the at least one processor is further configured to execute the instructions to generate information indicating an establishment state of a wireless link in the first communication path or the second communication path that is not used for communication as information regarding the communication state.

6. A monitoring method in a server device, comprising:
receiving sensor information from a sensor device that collects packets transferred between a wireless terminal and a first access point and between the wireless terminal and a second access point, the sensor information being generated based on the collected packets;
managing the first access point and the second access point in association with the wireless terminal when the wireless terminal performs communication with the first access point and the second access point by applying redundancy to a communication path; and
generating information regarding a communication state of redundant communication paths by using the sensor information regarding the first access point and the second access point.

7. The monitoring method according to claim 6, further comprising, when managing the first access point and the second access point in association with the wireless terminal, managing a first BSSID used by the wireless terminal for communication with a first access point and a second BSSID used by the wireless terminal for communication with a second access point in association with each other.

8. The monitoring method according to claim 6, further comprising, when generating information regarding the communication state, combining first sensor information regarding a first communication path with the first access point and second sensor information regarding a second communication path with the second access point, averaging the first sensor information and the second sensor information or selecting a maximum value or a minimum value of the first sensor information and the second sensor information, and generating information regarding the communication state.

9. A non-transitory computer-readable medium storing a program that causes a computer to execute:
receiving sensor information from a sensor device that collects packets transferred between a wireless terminal and a first access point and between the wireless terminal and a second access point, the sensor information being generated based on the collected packets;
managing the first access point and the second access point in association with the wireless terminal when the wireless terminal performs communication with the first access point and the second access point by applying redundancy to a communication path; and
generating information regarding a communication state of redundant communication paths by using the sensor information regarding the first access point and the second access point.

* * * * *